(12) United States Patent
Murugan et al.

(10) Patent No.: US 7,577,203 B2
(45) Date of Patent: Aug. 18, 2009

(54) MINIMIZING NON-DETERMINISTIC NOISE BY USING WAVELET TRANSFORM

(75) Inventors: Rajen Murugan, Round Rock, TX (US); Bhavesh A. Patel, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 778 days.

(21) Appl. No.: 11/089,384

(22) Filed: Mar. 24, 2005

(65) Prior Publication Data

US 2006/0215794 A1    Sep. 28, 2006

(51) Int. Cl.
*H04B 1/66* (2006.01)
*H03D 1/04* (2006.01)
*H04B 3/46* (2006.01)
*H03H 7/30* (2006.01)

(52) U.S. Cl. .................. 375/240.19; 375/346; 375/227; 375/229; 382/240

(58) Field of Classification Search .................. 375/346, 375/227, 229, 240.19
See application file for complete search history.

(56) References Cited

U.S. PATENT DOCUMENTS

| | | | | |
|---|---|---|---|---|
| 3,223,785 A * | 12/1965 | Drew et al. | ..................... | 379/11 |
| 5,790,550 A * | 8/1998 | Peeters et al. | ................ | 370/480 |
| 5,848,253 A * | 12/1998 | Walsh et al. | ................. | 710/308 |
| 5,946,355 A * | 8/1999 | Baker | ......................... | 375/286 |
| 6,334,219 B1 * | 12/2001 | Hill et al. | ..................... | 725/106 |
| 6,434,583 B1 * | 8/2002 | Dapper et al. | ................ | 708/409 |
| 2001/0014118 A1 * | 8/2001 | Lindquist | ..................... | 375/229 |
| 2001/0036231 A1 * | 11/2001 | Easwar et al. | .......... | 375/240.19 |
| 2002/0073258 A1 * | 6/2002 | Riley et al. | .................. | 710/105 |
| 2002/0089973 A1 * | 7/2002 | Manor | ......................... | 370/352 |
| 2002/0120849 A1 * | 8/2002 | McKinley et al. | ........... | 713/176 |
| 2003/0068091 A1 * | 4/2003 | Schwartz et al. | ............ | 382/246 |
| 2004/0022321 A1 * | 2/2004 | Satoh et al. | ............ | 375/240.19 |

OTHER PUBLICATIONS

Fiber wavelet filters [and planar waveguide couplers for full-wavelength demultiplexers] Cincotti, G.; Quantum Electronics, IEEE Journal of vol. 38, Issue 10, Oct. 2002 pp. 1420-1427.*
The improved lifting scheme and novel reconfigurable VLSI architecture for the 5/3 and 9/7 wavelet filters Chengyi Xiong; Sheng Zheng; Jinwen Tian; Jian Liu; Communications, Circuits and Systems, 2004. ICCCAS 2004. 2004 International Conference on vol. 2, Jun. 27-29, 2004 pp. 728-732 vol. 2.*

* cited by examiner

*Primary Examiner*—Mohammad H Ghayour
*Assistant Examiner*—Sarah Hassan
(74) *Attorney, Agent, or Firm*—Baker Botts L.L.P.

(57) ABSTRACT

A wavelet transform noise minimization circuit comprises a differential receiver, a voltage comparator, a wavelet transform circuit, an electrical idle (EI) detector circuit, a phase interpolator, a phase-locked-loop (PLL), and a reference clock buffer. The wavelet transform noise minimization circuit may be beneficially applied wherever there is non-deterministic (e.g., random) noise in the PHY layer during an electrical idle state. The wavelet transform noise minimization circuit may be used to improve noise margin during an electrical idle state, and/or reduce the occurrence of false activation of a PHY layer when in the electrical idle state.

23 Claims, 3 Drawing Sheets

MINIMIZING NON-DETERMINISTIC NOISE BY USING WAVELET TRANSFORM

TECHNICAL FIELD

The present disclosure relates generally to information handling systems and, more particularly, to minimizing non-deterministic noise sufficiently so functionality is maintained for a receiving PHY layer device in the information handling system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

With the present transition to and adoption of the latest very high speed serial technology (e.g., PCI Express—"PCI-E," Serial Attached SCSI—"SAS," and fully buffered dual inline memory module ((DIMM)—"FBD") to information handling system bus designs, noise may induce undesirable signal threshold levels in serial data carrying circuits that should otherwise remain in an idle condition when no data signals are present. In the PCI Express—"PCI-E," electrical specifications, an electrical idle condition is specified to have alternating current (AC) electrical noise of less than 65 millivolts peak-to-peak. According to the PCI-E specification, any voltage detected at the receiver that is greater than 65 millivolts and less than 170 millivolts, the PCI-E link will exit the electrical idle state. A problem therefore exists when an information handling system operating system ("OS") is supposed to be in a shutdown condition, but a data receiver does not remain in the electrical idle state, for example a memory controller hub ("MCH") timeout may occur. If a MCH timeout occurs, the data link will be brought down and cause the MCH to assert a NMI# which may result in the dreaded Windows Operating System "blue screen" and an NMI# Parity Error message. This is because the data receiver ("RX") never gets the message that it should be in the electrical idle state per a state machine implementation.

To further complicate the RX achieving a desired electrical idle state, the transmitter ("TX") may generate noise, e.g., up to about 20 millivolts, when in an idle condition, thus the idle noise margin is further diminished, e.g., 65 millivolts (RX)-20 millivolts (TX)=45 millivolts. This 45 millivolt peak-to-peak noise margin also must include noise from within the entire system, e.g., crosstalk, jitter, etc.

SUMMARY

Therefore what is needed is the ability to minimize the effects of noise during an idle condition, in real-time applications, that may be present on information handling system data buses, e.g., PHY layer signaling in SAS, PCI-E, FBD and other high speed serial technologies used in an information handling system. Specific example embodiments are presented herein that may provide a system, method and apparatus for using wavelet transform analysis to minimize non-deterministic (e.g., random) noise in the PHY layer during the electrical idle state. Wavelet transform may be preferred over Fourier transform, since it allows decomposition and analysis of a signal in both the time and frequency domains simultaneously. This may be important in maintaining an idle condition within a desired noise margin budget. For example, the PCI-E electrical specification specifies that during electrical idle the peak-to-peak alternating current (AC) noise at the serial data line receiver should be less than 65 millivolts. With transmitter generated noise that may be about 20 millivolts peak-to-peak, this may reduce the noise specification at the receiver during electrical idle to about 45 millivolts.

A technical advantage of the present disclosure may be reduction of non-deterministic noise in a serial information bus during an electrical idle state. Still another technical advantage may be simultaneous decomposition and analysis of signals in both the time and frequency domains. Yet another technical advantage may be improved noise margin of a serial information bus within the information handling system.

BRIEF DESCRIPTION OF THE DRAWINGS

A more complete understanding of the present disclosure thereof may be acquired by referring to the following description taken in conjunction with the accompanying drawings wherein.

Figure 1:
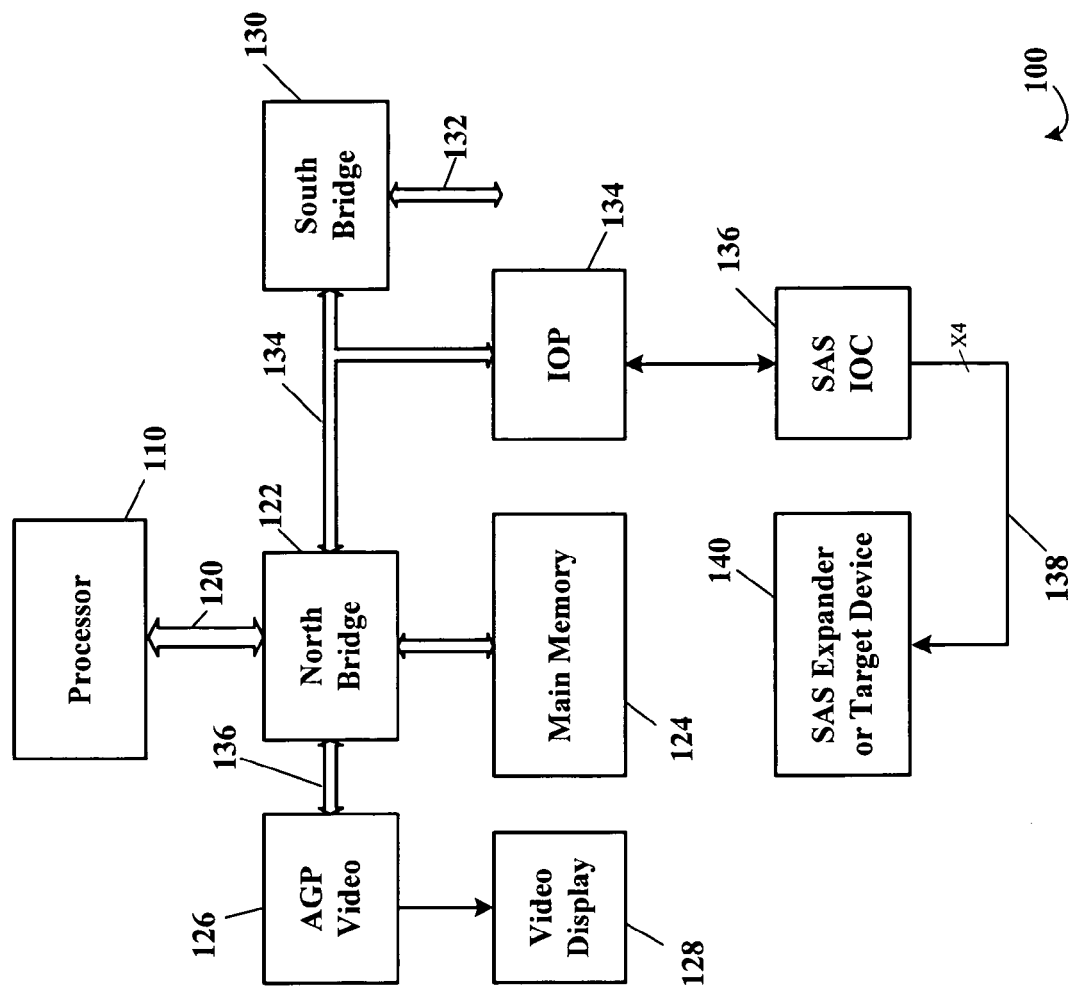
FIG. 1 is a schematic block diagram of an information handling system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses. In one example embodiment, the information handling system is a computer system. The information handling system, generally referenced by the numeral 100, comprises at least one processor 110 coupled to a host bus(es) 120. A north bridge 122, which may also be referred to as a memory controller hub or a memory controller, is coupled to a main system memory 124. The north bridge 122 is coupled to the at least one system processor 110 via the host bus(es) 120. The north bridge 122 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 122. The chip set may also be packaged as an application specific integrated circuit (ASIC). The north bridge 122 typically includes functionality to couple the main system memory 124 to other devices within the information handling system 100. Thus, memory controller functions such as main memory control functions typically reside in the north bridge 122. In addition, the north bridge 122 provides bus control to handle transfers between the host bus 120 and a second bus(es), e.g., PCI bus 134, AGP bus 136 coupled to a video graphics interface 126 which drives a video display 128. A third bus(es) 132 may also comprise other industry standard buses or proprietary buses, e.g., ISA, SCSI, I$^2$C, SPI, USB buses through a south bridge(s) (bus interface) 130. An input-output processor (IOP) 134 of a SAS adapter is coupled to the north bridge 122. A SAS input-output controller (IOC) 136 is coupled to the IOP 134. The IOC 136 is adapted for coupling to an SAS expander or target device 140 through, for example, a plurality of SAS physical links 138. The main memory 124 may be comprised of fully buffered dual inline memory modules ((DIMM)—"FBD").

Figure 2:
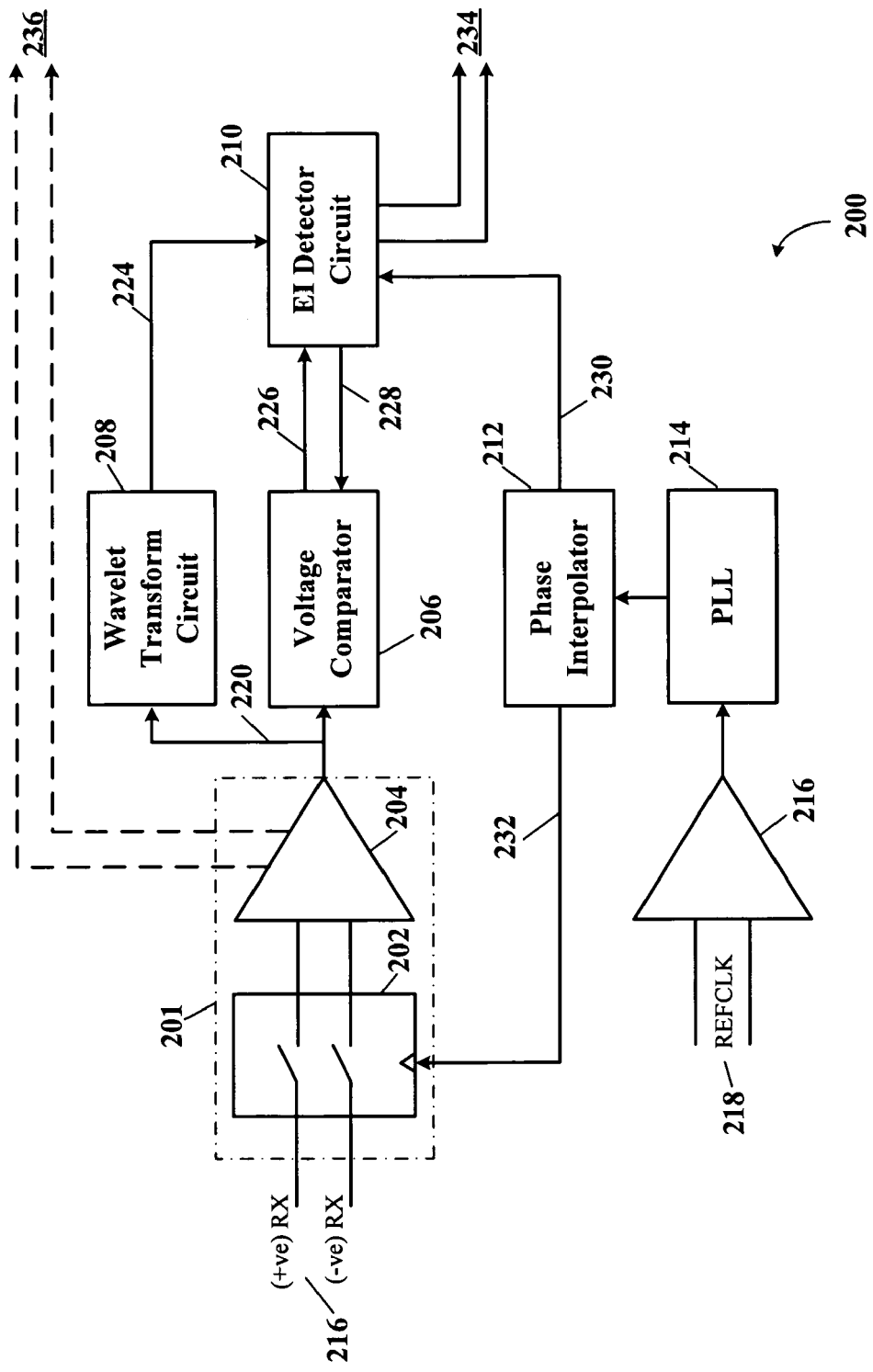
FIG. 2 is a schematic block diagram of a wavelet transform noise minimization circuit used for enhancement of noise margin in achieving and maintaining an electrical idle state, according to a specific example embodiment of the present disclosure.

Referring to FIG. 2, depicted is a schematic block diagram of a wavelet transform noise minimization circuit used for enhancement of noise margin in achieving and maintaining an electrical idle state, according to a specific example embodiment of the present disclosure. A wavelet transform noise minimization circuit, generally represented by the numeral 200, comprises a differential receiver 201, a voltage comparator 206, a wavelet transform circuit 208, an electrical idle (EI) detector circuit 210, a phase interpolator 212, a phase-locked-loop (PLL) 214, and a reference clock buffer 216. The wavelet transform noise minimization circuit 200 may be beneficially applied wherever there is non-deterministic (e.g., random) noise in the PHY layer during an electrical idle state. The wavelet transform noise minimization circuit 200 preferably may be used to improve noise margin during an electrical idle state, and/or reduce the occurrence of false activation of a PHY layer when in the electrical idle state.

The differential input receiver 201 may be coupled to a serial link 216. The differential input receiver 201 may be comprised of a differential signal input detector 202 and a differential input to a single ended output amplifier 204. The differential receiver 201 detects a differential noise input voltage signal, Vdiff_in, the magnitude thereof being represented as signal 220. The magnitude, e.g., peak-to-peak voltage, of Vdiff_in (signal 220) may be compared to reference threshold voltage, Vdiff_thres, represented as signal 228, with a voltage comparator 206. Vdiff_thres (signal 228) may be dynamically generated with the electrical idle (EI) detector circuit 210 by computing the transfer function (e.g., the transfer function is a mathematical representation of the relationship between the input and output of a linear time-invariant system) of the electrical idle (EI) detector circuit 210. The transfer function allows determination of filter characteristics, e.g., the electrical characteristics, of the electrical idle (EI) detector circuit 210.

If Vdiff_in (signal 220) is less than (<) Vdiff_thres (signal 228), then the serial link 216 appears to the information handling system 100 as being in an electrical idle (EI) state. However, if Vdiff_in (signal 220) is equal to or greater than (=>) Vdiff_thres (signal 228), then the Vdiff_in (signal 220) may be coupled to the wavelet transform circuit 208 where it is decomposed into both the time and frequency domains. Also an output 226 from the voltage comparator 206 may indicate to the electrical idle (EI) detector circuit 210 that Vdiff_in (signal 220) is equal to or greater than (=>) Vdiff_thres (signal 228). From this decomposition, the wavelet transform circuit 208 determines what level of adaptive filtration (time domain) and what equalizer tap settings (frequency domain) may be used to clean the incoming noise signal, Vdiff_in (signal 220). Vdiff_out (signal 224) may be an inverted, noise cleaned, filtered and equalized Vdiff_in (signal 222) that may be generated in the wavelet transform circuit 208 by using an inverse wavelet transform to the time domain.

The Vdiff_out (signal 224) may be coupled to the electrical idle (EI) detector circuit 210. Vdiff_out (signal 224) may be compared to Vdiff_in (signal 220) in the aforementioned operation and the comparison may continue until Vdiff_out (signal 224) is less than (<) Vdiff_in (signal 220). During a normal data transfer state (not in electrical idle) the received signal may follow the dashed lines as signal 236 to the PHY layer of the information handling system 100.

A system clock (REFCLK) 218, e.g., 100 MHz, that may be available from the information handling system 100, may be received by a differential input clock buffer amplifier 216 and applied to a phase-locked-loop (PLL) 214. The PLL 214 may be used as a coherent frequency multiplier for generating a very high frequency clock, e.g., 1.25 GHz. The very high frequency clock from the PLL 214 may be applied to the phase interpolator 212. The phase interpolator 212 may generate a plurality of phase shifted and phase coherent clock signals based upon the output of the PLL 214. These plurality of phase shifted and phase coherent clock signals may be applied to the differential input receiver 201 (clock signal 232) and/or the electrical idle (EI) detector circuit 210 (clock signal 230). The clock signal 232 may be used in detecting the data signals from the serial link 216 and the clock signal 230 may be used in the operation of the electrical idle (EI) detector circuit 210.

The differential input receiver 201 may automatically route its output to a signal output 236 (e.g., differential output, single ended output, etc.,) that is coupled to, for example but not limited to, an input of the PHY layer of the SAS IOC 136 (FIG. 1) when the noise signal from the serial link 216 is at a low enough level to be sufficiently below a desired idle threshold, or when an actual data signal is being received from the serial link 216. Otherwise, when the noise signal from the serial link 216 is not at a signal level low enough to be sufficiently below the desired idle threshold then the wavelet transform noise minimization circuit 200 processes the received idle noise threshold from the serial link 216 and outputs that processed signal on the signal output 234. A received data signal may also be processed as described herein if there is an undesirable amount of noise with the desired received data signal. The signal processing of the wavelet transform noise minimization circuit 200 may be performed in substantially real time.

Figure 3:
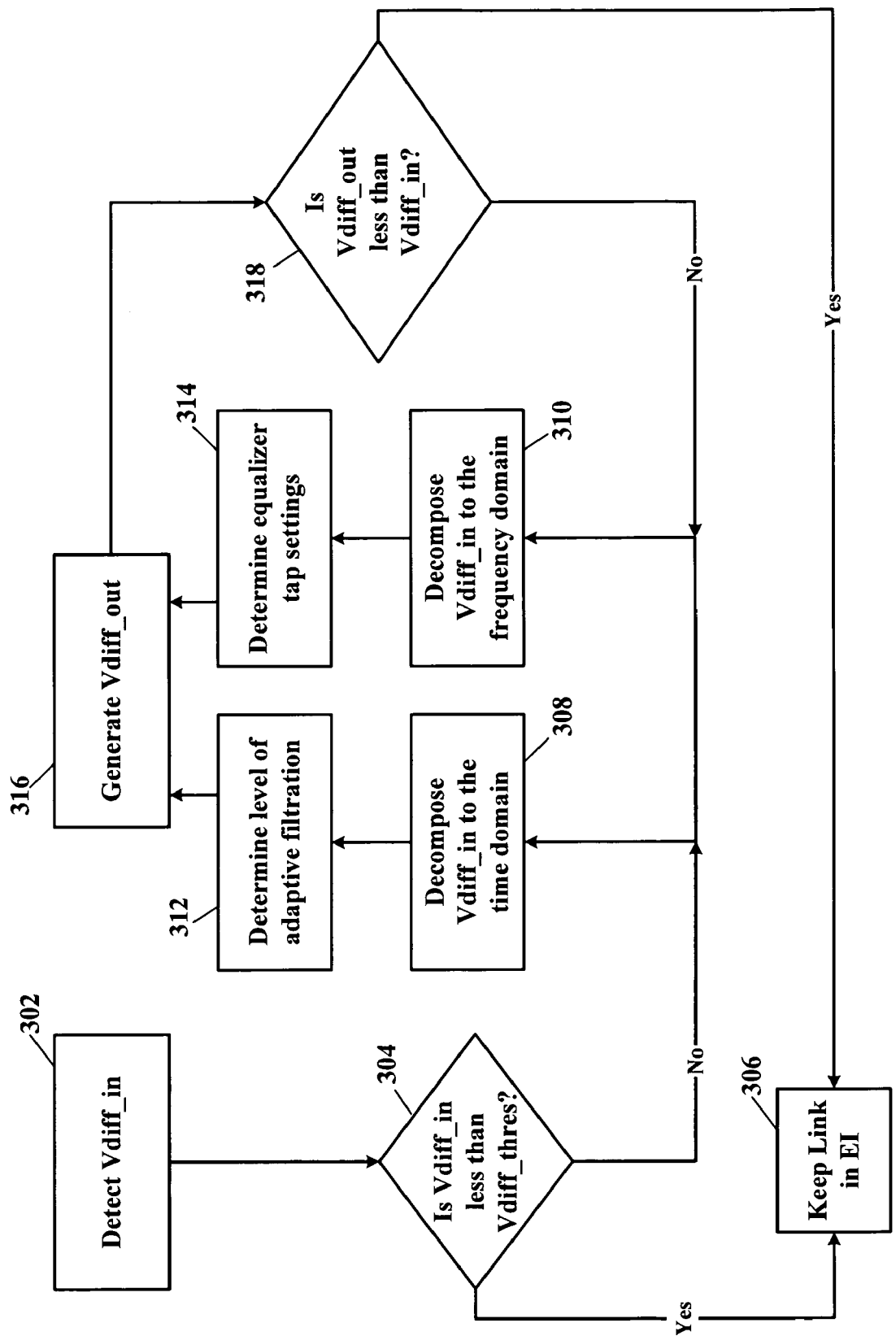
FIG. 3 is schematic flow diagram of the operation of a wavelet transform noise minimization circuit, according to a specific example embodiment of the present disclosure.

Referring now to FIG. 3, depicted is schematic flow diagram of the operation of a wavelet transform noise minimization circuit, according to a specific example embodiment of the present disclosure. In step 302, Vdiff_in is detected e.g., with a differential receiver 201. In step 304, the detected Vdiff_in is compared to Vdiff_thres, and if Vdiff_in is less than Vdiff_thres, then, in step 306, the serial link 216 may be considered to be in an electrical idle (EI) state without further processing by the wavelet transform noise minimization circuit 200, and Vdiff_in may be coupled directly to the PHY layer (not shown). Also if there is a desired data stream on Vdiff_in, then Vdiff_in may be coupled directly to the PHY layer (not shown).

However, in step 304, if Vdiff_in is equal to or greater than Vdiff_thres then, in step 308, Vdiff_in may be decomposed in the time domain and, in step 310, Vdiff_in may be decomposed in the frequency domain. In step 312, the time domain decomposed Vdiff_in may have an adaptive filtration level determined. In step 314, the frequency domain decomposed Vdiff_in may have equalizer tap settings determined. In step 316, Vdiff_out may be generated by inverting, noise cleaning, filtering and equalizing Vdiff_in with an inverse wavelet transform to the time domain. In step 318, Vdiff_out is compared to Vdiff_in. If Vdiff_out is less than Vdiff_in then the serial link 216 may be considered to be in the electrical idle (EI) state. However, if Vdiff_out greater than or equal to Vdiff_in then the aforementioned steps are repeated until Vdiff_out is less than Vdiff_in.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for minimizing the effect of non-deterministic noise during an idle condition of a serial data link in an information handling system, said method comprising the steps of:
   a) detecting a non-deterministic noise signal of a serial data link;
   b) comparing the non-deterministic noise signal to a noise threshold signal, wherein:
      b1) if the non-deterministic noise signal is less than the noise threshold signal, then keeping the serial data link in an electrical idle state, and
      b2) if the non-deterministic noise signal is greater than or equal to the noise threshold signal, then
         b2a) decomposing the non-deterministic noise signal in a time domain,
         b2b) decomposing the non-deterministic noise signal in a frequency domain,
         b2c) determining a level of adaptive filtration for the time domain decomposed non-deterministic noise signal, and
         b2d) determining equalizer tap settings for the frequency domain decomposed non-deterministic noise signal;
   c) generating an output signal from the adaptively filtered time domain decomposed non-deterministic noise signal and the tap equalized frequency domain decomposed non-deterministic noise signal;
   d) comparing the output signal to the non-deterministic noise signal, wherein:
      d1) if the output signal is less than the non-deterministic noise signal, then keeping the serial data link in the electrical idle state, and
      d2) if the output signal is greater than or equal to the non-deterministic noise signal, then repeating steps b2a, b2b, b2c, b2d, c, d, d1 and d2;
   wherein each of the steps is performed in the information handling system.

2. The method of claim 1, further comprising the step of coupling the non-deterministic noise signal to a PHY layer of the information handling system when the non-deterministic noise signal is less than the noise threshold signal.

3. The method of claim 1, further comprising the step of coupling the output signal from the adaptively filtered time domain decomposed non-deterministic noise signal and the tap equalized frequency domain decomposed non-deterministic noise signal to a PHY layer of the information handling system when the non-deterministic noise signal is greater than or equal to the noise threshold signal.

4. The method of claim 1, wherein the noise threshold signal is less than about 65 millivolts peak-to-peak.

5. The method of claim 1, wherein the noise threshold signal is less than about 45 millivolts peak-to-peak.

6. An information handing system having a non-deterministic noise minimization circuit for improving noise margin of a serial data link electrical idle state, said system comprising:
   an information handling system having a wavelet transform noise minimization circuit coupled to a serial data link, wherein the wavelet transform noise minimization circuit comprises:
      a serial data receiver having an output, and an input coupled to the serial data link;
      a voltage comparator having a first input coupled to the output of the serial data receiver;
      a wavelet transform circuit having an input coupled to the output of the serial data receiver; and
      an electrical idle detector circuit having a first input coupled to an output of the wavelet transform circuit, a second input coupled to an output of the voltage comparator, and an output coupled to a second input of the voltage comparator, wherein if a non-deterministic noise signal from the output of the serial data receiver is greater than or equal to a noise threshold signal from the output of the electrical idle detector circuit, then the wavelet transform circuit decomposes the non-deterministic noise signal into time and frequency domains, determines an adaptive filtration level for the time domain decomposed non-deterministic noise signal and equalizer tap settings for the frequency domain decomposed non-deterministic noise signal; and the wavelet transform circuit generates an adaptively filtered time domain decomposed non-deterministic noise signal and the tap equalized frequency domain decomposed non-deterministic noise signal at its output which is coupled to the first input of the electrical idle detector circuit.

7. The information handing system according to claim 6, wherein the non-deterministic noise signal is coupled to a PHY layer of the information handling system when the non-deterministic noise signal is less than the noise threshold signal during an electrical idle state.

8. The information handing system according to claim 6, wherein a second output of the wavelet transform circuit is coupled to a PHY layer of the information handling system when the non-deterministic noise signal is greater than or equal to the noise threshold signal during an electrical idle state.

9. The information handing system according to claim 6, wherein the output of the wavelet transform circuit comprises an inverted, noise cleaned, filtered and equalized version of the non-deterministic noise signal.

10. The information handing system according to claim 9, wherein the inverted, noise cleaned, filtered and equalized version of the non-deterministic noise signal is generated by the wavelet transform circuit using an inverse wavelet transform to the time domain.

11. The information handing system according to claim 10, wherein the wavelet transform circuit decomposes and analyzes the non-deterministic noise signal substantially simultaneously in both the time and frequency domains.

12. The information handing system according to claim 6, further comprising a clock buffer coupled to a system clock.

13. The information handing system according to claim 12, further comprising a phase-locked-loop (PLL) coupled to an output of the clock buffer wherein the PLL coherently multiplies a frequency of the system clock.

14. The information handing system according to claim 13, further comprising a phase interpolator coupled to an output of the PLL, wherein the phase interpolator generates a plurality of phase coherent clock signals.

15. The information handing system according to claim 13, wherein outputs of the phase interpolator are coupled to the serial data receiver and the electrical idle detector.

16. The information handing system according to claim 6, wherein the noise threshold signal is less than about 65 millivolts peak-to-peak.

17. The information handing system according to claim 6, wherein the noise threshold signal is less than about 45 millivolts peak-to-peak.

18. The information handing system according to claim 6, wherein the serial data receiver input is a differential input.

19. An apparatus for wavelet transform noise minimization, comprising:

a serial data receiver having an output, and an input adapted for coupling to a serial data link;

a voltage comparator having a first input coupled to the output of the serial data receiver;

a wavelet transform circuit having an input coupled to the output of the serial data receiver; and an electrical idle detector circuit having a first input coupled to an output of the wavelet transform circuit, a second input coupled to an output of the voltage comparator, and an output coupled to a second input of the voltage comparator, wherein if a non-deterministic noise signal from the output of the serial data receiver is greater than or equal to a noise threshold signal from the output of the electrical idle detector circuit, then the wavelet transform circuit decomposes the non-deterministic noise signal into time and frequency domains, determines an adaptive filtration level for the time domain decomposed non-deterministic noise signal and equalizer tap settings for the frequency domain decomposed non-deterministic noise signal; and the wavelet transform circuit generates an adaptively filtered time domain decomposed non-deterministic noise signal and the tap equalized frequency domain decomposed non-deterministic noise signal at its output which is coupled to the first input of the electrical idle detector circuit.

20. The apparatus according to claim 19, wherein the output of the wavelet transform circuit comprises an inverted, noise cleaned, filtered and equalized version of the non-deterministic noise signal.

21. The apparatus according to claim 20, wherein the inverted, noise cleaned, filtered and equalized version of the non-deterministic noise signal is generated by the wavelet transform circuit using an inverse wavelet transform to the time domain.

22. The apparatus according to claim 21, wherein the wavelet transform circuit decomposes and analyzes the non-deterministic noise signal substantially simultaneously in both the time and frequency domains.

23. The apparatus according to claim 19, wherein a second output of the wavelet transform circuit is adapted for coupling to a PHY layer of an information handling system when the non-deterministic noise signal is greater than or equal to the noise threshold signal during an electrical idle state.

* * * * *

UNITED STATES PATENT AND TRADEMARK OFFICE
CERTIFICATE OF CORRECTION

PATENT NO. : 7,577,203 B2  Page 1 of 1
APPLICATION NO. : 11/089384
DATED : August 18, 2009
INVENTOR(S) : Murugan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1182 days.

Signed and Sealed this

Seventh Day of September, 2010

David J. Kappos
*Director of the United States Patent and Trademark Office*